| United States Patent [19] | [11] | 4,405,706 |
|---|---|---|
| Takahashi et al. | [45] | Sep. 20, 1983 |

[54] OPTICAL INFORMATION RECORDING MEDIUM

[75] Inventors: Yonosuke Takahashi; Minoru Wada; Eiichi Hasegawa, all of Saitama, Japan

[73] Assignee: Fuji Photo Film Co., Ltd., Kanagawa, Japan

[21] Appl. No.: 388,366

[22] Filed: Jun. 14, 1982

[30] Foreign Application Priority Data

Jun. 12, 1981 [JP] Japan ................... 56-90377

[51] Int. Cl.³ ............................................ G01D 15/34
[52] U.S. Cl. ..................... 430/271; 430/276; 430/525; 430/531; 430/534; 430/536; 430/945; 346/135.1; 428/461; 428/515; 428/913
[58] Field of Search ............... 430/945, 525, 526, 531, 430/533, 534, 271, 271 A, 276; 428/913, 209, 461, 515; 346/135.1

[56] References Cited

U.S. PATENT DOCUMENTS

| 2,984,569 | 5/1961 | Huys et al. | 430/534 |
|---|---|---|---|
| 3,911,444 | 10/1975 | Lou et al. | 430/945 |
| 4,188,214 | 2/1980 | Kido et al. | 430/945 |
| 4,216,501 | 8/1980 | Bell | 346/135.1 |
| 4,233,626 | 11/1980 | Bell | 346/135.1 |
| 4,271,256 | 6/1981 | Kido | 430/525 |
| 4,291,119 | 9/1981 | Kido et al. | 430/525 |
| 4,334,233 | 6/1982 | Murakami | 346/135.1 |
| 4,340,655 | 7/1982 | Hollister et al. | 346/135.1 |

*Primary Examiner*—Mary F. Downey
*Attorney, Agent, or Firm*—Sughrue, Mion, Zinn, Macpeak and Seas

[57] ABSTRACT

An optical information recording medium is disclosed. The medium is comprised of a plastic substrate made of acrylic resin, an undercoating comprised at least one of polyvinyl pyrrolidone and polyvinyl formal on the substrate, and a heat mode recording layer comprised of metal on the undercoating. The recording medium has improved adhesion between the recording layer and the substrate without decreasing the sensitivity of the recording layer.

19 Claims, No Drawings

OPTICAL INFORMATION RECORDING MEDIUM

FIELD OF THE INVENTION

The present invention relates to an optical information recording medium designed for making records by means of light such as a laser beam having a high energy density. More particularly, it is concerned with an optical information recording medium designed for making records by means of light such as a laser beam having a high energy density, in which the adhesion between the substrate and the heat mode recording layer is improved.

BACKGROUND OF THE INVENTION

In the past, there have been recording media on which records are made thermally by the use of light beams such as lasers having a high energy density. In such thermal recording media, information is recorded by the difference in optical density on the recording layer. The recording layer has a high optical density and absorbs light beams of high energy density which impinge thereon. The absorption of light brings about a local temperature rise, causing a thermal change such as melting-cohesion and evaporation to take place in the recording layer. The information thus recorded can be read by irradiating the laser beam for reading (cf. U.S. Pat. Nos. 4,188,214, 4,291,119, 4,216,501, and 4,233,626.

These types of thermal recording medium usually do not need development and fixing processes and darkroom operations because of their insensitivity to room light. In addition, they provide high-contrast images and permit information to be added later on.

Recording on such a thermal recording medium is usually accomplished by converting the information to be recorded into electrical time series signals and scanning the recording medium with a laser beam which is modulated in accordance with the signals. This method is advantageous in that recording images can be obtained on real time.

The recording layer of such thermal recording medium is usually made of metals, dyes, or plastics, as described in "Electron, Ion, and Laser Beam Technology", by M. L. Levenc; The Proceedings of the Eleventh Symposidum (1969); "Electronic" (Mar. 18, 1968), P. 50; "The Bell System Technical Journal", by D. Maydan, Vol. 50 (1971), P. 1761; and "Science", by C. O. Carlson, Vol. 154 (1966), P. 1550.

According to these disclosures, some of the metal recording layers are formed by depositing a thin film of Bi, Sn, or In on the substrate. Such recording layers are superior as thermal recording media because they permit the recording of images with good resolution at high contrast.

The substrates for such recording media have conventionally been comprised of glass plate and plastics film. The glass plate is generally used because of its good surface properties. However, a glass plate is not desirable because it can be easily broken during use and storage. On the other hand, plastic films are not fragile, but poorer in the surface properties as compared with glass plates. The poorer surface properties decrease the S/N ratio of reproduced signals in the case of a thermal recording medium in which a recording layer of metal thin film is formed directly on the plastics substrate. In order to overcome this problem, efforts have been made to provide a polymer layer between the recording layer and the plastics substrate so that the recording layer is not adversely affected by the poor surface properties of the plastics substrate. A variety of polymers are available for such purposes. (For example, see Japanese Patent Application (OPI) No. 14504/1980 which corresponds to British Patent 2,026,346.) (The term "OPI" as used herein refers to a "published unexamined" Japanese Patent Application).

The recording medium described above is used by recording the information by irradiating the laser beam onto the recording layer from the substrate side. The recorded information is read by irradiating the laser beam for reading from the substrate side. The substrate for such a system is preferably comprised of acrylic resin such as polymethyl methacrylate and methyl methacrylate copolymer which are transparent to the laser light. The acrylic resin substrate, however, has poor adhesion with respect to the metallic recording layer. A recording medium used as an optical disc memory must be capable of keeping information for more than 10 years. Any decrease of adhesion with time leads to poor reliability. In order to overcome this disadvantage, the present inventors tried to use the undercoating of conventional polymers and the polymer as disclosed in the above-mentioned Japanese Patent Application (OPI) No. 14504/1980. However, it was not possible to obtain improved adhesion or prevent the adhesion from degrading with time. In some cases, the undercoating adversely affected the sensitivity of the recording layer.

SUMMARY OF THE INVENTION

It is an object of the present invention to provide an optical information recording medium having improved adhesion between the recording layer and a plastic substrate comprising acrylic resin.

It is another object of the present invention to provide an optical information recording medium having improved adhesion between the recording layer and a plastic substrate comprising acrylic resin without decreasing the sensitivity of the recording layer.

It is a further object of the present invention to provide an optical information recording medium in which the adhesion between the recording layer and the substrate is prevented from degradation with time.

After extensive studies, the present inventors found that the objects of this invention can be achieved by providing the substrate with an undercoating composed of at least one of polyvinyl pyrrolidone and polyvinyl formal.

The present invention resides in an optical recording medium which comprises a plastics substrate made of acrylic resin, an undercoating made of at least one of polyvinyl pyrrolidone and polyvinyl formal on the substrate, and a heat mode recording layer made of metal on the undercoating.

DETAILED DESCRIPTION OF THE INVENTION

The acrylic resin constituting the substrate is preferably a homopolymer of a alkyl (1 to 6 carbon atoms) ester of methacrylic acid or a copolymer of this alkyl ester of methacrylic acid and vinyl monomer such as styrene, butyl methacrylate, vinyl acetate, acrylonitrile, butadiene and isoprene. Preferable among them are a polymethyl methacrylate and methyl methacrylate copolymers such as methyl methacrylate-styrene copolymers. The vinylmonomer should preferably be less than 30 wt%, and more preferably be less than 15 wt% in the copolymer.

The acrylic resin used in this invention may be incorporated with a variety of conventional additives, e.g., a plasticizer such as triphenol phosphite, an ultravilet absorber, and pigments such as titanium oxide and carbon black. The plasticizer may be incorporated in an amount of 0.005 to 5 wt% based on the resin and the pigment may be incorporated in an amount of 0.1 to 30 wt% based on the resin. The substrate may be transparent or opaque to the light used for recording or reading information.

The polyvinyl pyrrolidone used for undercoating in this invention should have a molecular weight which permits the formation of a film. The molecular weight is usually from 10,000 to 500,000, preferably 30,000 to 300,000. Likewise, the polyvinyl formal should have a molecular weight which permits the formation of a film. The molecular weight is usually from 10,000 to 300,000, preferably from 20,000 to 250,000.

The polyvinyl formal is prepared by reacting formalin with polyvinyl alcohol prepared from vinyl acetate ester. The polyvinyl alcohol should have a degree of saponification of from 95 to 100%, preferably from 98 to 100%. The degree of formalization with formalin is usually 30 to 90%, preferably 50 to 75%.

The polyvinyl pyrrolidone and polyvinyl formal may be used individually or in combination for undercoating. It is also possible to laminate undercoatings made of the individual polymers. The undercoating may contain a plasticizer such as triphenyl phosphite in an amount of 0.005 to 5 wt% for the undercoating.

The undercoating which is comprised of at least one of polyvinyl pyrrolidone and polyvinyl formal is formed on the substrate by dissolving the above-mentioned polymer in a suitable solvent such as ethanol, methanol, methyl cellosolve, methyl ethyl ketone, dioxane, tetrahydrofuran, acetone, and methyl cellosolve acetate, and applying the resulting solution onto the substrate. The concentration of the solution is adjusted according to the coating method and speed. It is usually 0.001 to 10 wt%. The solvents are used individually or in combination. After application, the undercoating is dried at 50° to 130° C., preferably at 70° to 110° C. at which the polymer does not undergo degradation.

The thickness of the undercoating is from 100 Å to 30 μm, preferably from 500 Å to 3 μm. If it is thinner than 100 Å, it is difficult to uniformly cover the substrate with the above-mentioned polymer; and if it is thicker than 30 μm, it is difficult to make the film uniform in thickness.

The metals used for the heat mode recording layer in this invention include Mg, Sc, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Sn, As, Sb, Bi, Se, and Te, which are used individually or in combination. Preferable among them are Mg, Zn, Al, In, Sn, Bi, and Te because of their low melting poing.

The recording layer should be thick enough to provide sufficient reflectivity or optical density for the image. The thickness is usually 50 to 2,000 Å, preferably 300 to 1,500 Å, depending on the transmission density required and the type of metal.

The recording layer may be made of metal in the form of simple substance or alloy, by evaporation deposition, sputtering, ion plating, electrolytic plating, or electroless plating. The recording layer is formed as a single layer or multiple layer on the aforesaid substrate.

This metal for the recording layer may be incorporated with a substance that promotes the sensitivity or thermal deformation. Also, the recording layer may be laminated with a layer made of such a substance. In the former case, the technique of codeposition may be used.

Substances which may be used for the object mentioned above include, for example, oxides such as PbO, $WO_3$, $TiO_2$, SiO, $SiO_2$, and $ZrO_2$; chalcogenide substances containing at least one of Ge, In, Sn, Cu, Ag, Fe, Bi, Al, Si, Zn, and V and chalcogen selected at least one of S, Se and Te; and halides such as $PbX_2$, AgX, $SnX_2$, $SbX_5$, and $SbX_3$ (where X is F, Cl, Br, or I). In addition, the following metal sulfides and oxides disclosed in Japanese Patent Application (OPI) Nos. 78236/1976 and 20821/1977 may be used for the same object. It is also possible to use sulfides such as GeS, $GeS_2$, $Cr_2S$, $MoS_2$, CoS, NiS, and PdS, flourides such as $MgF_2$, $CaF_2$ and $RhF_2$ and metal oxides such as MoO, InO, $In_2O$, and GeO.

When this compound is mixed with the metal for the recording layer, this compound is incorporated into the metal in an amount of 10 to 70 vol%, preferably 20 to 50%, based on the total substance constituting the recording layer. When the recording layer contains the compound, the total thickness of the recording layer may be as mentioned above.

When this substance is laminated on the metal layer, the thickness of the laminate varies depending on the type of metal used and the thickness of the metal layer. It is usually 10 to 1500 Å, preferably 50 to 1000 Å. When a layer of this compound is laminated on the metal layer, the compound is used in an amount as mentioned above.

In order to increase the mechanical strength of the recording medium of this invention, the recording layer may be covered with a protective layer. The material for the protective layer includes, for example, gelatin, gelatin derivatives, cellulose derivatives, polysaccharide such as dextran, latex vinyl polymer, and synthetic polymers listed below. Preferable synthetic polymers are described in U.S. Pat. Nos. 2,142,586, 3,193,386, 3,062,674, 3,220,844, 3,287,289, and 3,411,911. Examples of preferable polymers include polyvinyl butyral, ethylene-vinyl acetate copolymer, polyacrylamide, cellulose acetate butyrate, cellulose acetate propionate, polymethyl methacrylate, polyvinyl pyrrolidone, polystyrene, ethyl cellulose, polyvinyl chloride, chlorinated rubber, polyisobutylene, butadiene-styrene copolymer, vinyl chloride-vinyl acetate copolymer, vinyl chloride-vinyl acetate-maleic acid terpolymer, polyvinyl alcohol, polyvinyl acetate, benzyl cellulose, cellulose acetate, cellulose propionate, cellulose acetate phthalate, polyvinyl formal, polyvinyl pyridine, polyvinylidene chloride, methyl ether-maleic anhydride copolymer, cellulose acetate, cellulose nitrate, butyl cellulose, carboxy methyl cellulose, hydroxy ethyl cellulose, polystyrene, polyethylene glycol, polyethylene oxide, polyacrylate, polysulfoalkyl acrylate, polysulfoalkyl methacrylate, polyamide, terpene resin, alginic acid and derivatives thereof, conductive polymer derived from onium salt halide, and phenolic resin. In addition, higher fatty acids such as behenic acid are also preferable materials. These organic compounds may be used individually or in combination. The thickness of the protective layer is 0.01 to 500 μm.

The undercoating as mentioned above improves the adhesion between the substrate and the recording layer, and prevents the adhesion from degrading with time.

The undercoating of the aforesaid polymer does not decrease the sensitivity of the recording layer. When polyvinyl pyrrolidone is used, the sensitivity tends to increase.

The invention will now be described in detail with reference to the following example.

EXAMPLE

The following two kinds of solutions (A) and (B) were prepared for undercoating.

| (A) | Polyvinyl pyrrolidone (molecular weight: ca. 200,000) | 2 g |
| | Ethyl alcohol | 60 ml |
| | Methyl ethyl ketone | 40 ml |
| (B) | Polyvinyl formal* (molecular weight: ca. 100,000) | 2 g |
| | Methyl cellosolve acetate | 20 ml |
| | Methyl ethyl ketone | 50 ml |
| | Dioxane | 30 ml |

*Prepared by formalizing to 70% polyvinyl alcohol having a degree of saponification of 99.5%.

The resulting solutions were filtered using a filter having a pore size of 0.2 μm.

Each solution was applied to two 1-mm thick substrates of a polymethylmethacrylate resin by a rotary method (at 1000 rpm for 30 seconds), followed by drying at 80° C. for 2 min. Onto the undercoated substrate was codeposited In and GeS by vacuum vapor deposition, whereby the recording layer was formed. (Composition of In:GeS was 4:3 by volume.)

The recording layer was coated with the following three solutions, in the order listed, to form the protective layers. (Each solution was applied by a rotary method at 500 rpm for 30 seconds, and dried at 80° C. for 2 min.)

| (1) | Solution for protective layer | |
| | Ethylene-vinyl acetate copolymer* | 6 g |
| | Toluene | 30 ml |
| | Cyclohexane | 70 ml |
| (2) | Solution for protective layer | |
| | Polyvinyl butyral** | 5 g |
| | Isopropyl alcohol | 80 ml |
| | Methyl cellosolve | 20 ml |
| (3) | Solution for protective layer | |
| | Behenic acid | 0.5 g |
| | Cyclohexane | 1 liter |

*"EVAFLEX #410, product of Mitsui Polychemical Co., Ltd.
**Type 3000K, product of Denki Kagaku Kogyo K.K.

The recording materials thus prepared were evaluated with respect to their sensitivity to laser light and their adhesion ability before and after an accelerated deterioration test (in a constant temperature bath at 60° C. and 90% RH, for 7 days).

The sensitivity to laser was expressed by the laser output that gave a recording line having a width of 10 μm when the recording material was scanned with a laser beam (argon ion laser, wavelength 5145 Å, concentrated to a beam diameter of 25 μm by a lens, irradiated from the recording layer side) at a speed of 19 m/s.

The adhesion strength was measured by peeling away a commercial adhesive tape (polyester tape made by Nitto Denko K.K.) which was stuck to the layer.

For comparison, the undercoatings were prepared with ethyl cellulose, vinyltoluene/butadiene copolymer, polycarbonate, and polyvinyl acetate. Test results for these samples are shown in the following table.

It is to be noted that polyvinyl pyrrolidone and polyvinyl formal are superior in adhesion to other polymers.

| | Polymer for undercoating | Sensitivity to laser | Adhesion test* Before deterioration test | Adhesion test* After deterioration test |
|---|---|---|---|---|
| Invention Examples | | | | |
| A | Polyvinyl pyrrolidone | 275 mW | O | O |
| B | Polyvinyl formal | 300 | O | O |
| Comparison Examples | | | | |
| C | Ethyl cellulose | 300 | X | X |
| D | Vinyltoluene/butadiene copolymer | 300 | X | X |
| E | Polycarbonate | 300 | O | X |
| F | Polyvinyl acetate | 300 | X | X |
| G | None (Acrylic substrate) | 300 | X | X |

Note
*The deposited recording layer was not peeled by the tape peel test ... O
The deposited recording layer was peeled by the tape peel test ... X
C: "Ethyl cellulose T-100", product of Hercules.
D: "Pliolite VT", product of Goodyear.
E: "Upilon", product of Mitsubishi Gas Kagaku.
F: "Esunyl C-2", product of Sekisui Chemical.

What is claimed is:

1. An optical information recording medium, comprising:
   a plastic substrate comprised of an acrylic resin;
   an undercoating layer positioned on a surface of the substrate, the undercoating layer being comprised of a compound selected from the group consisting of polyvinyl pyrrolidone and polyvinyl formal; and
   a heat mode recording layer positioned on the undercoating layer, the recording layer being comprised of a metal.

2. An optical information recording medium as claimed in claim 1, wherein the acrylic resin is a homopolymer or copolymer of an alkyl ester of methacrylic acid, said alkyl having 1 to 6 carbon atoms.

3. An optical information recording medium as claimed in claim 1, wherein the polyvinyl pyrrolidone has a molecular weight from 10,000 to 500,000.

4. An optical information recording medium as claimed in claim 1, wherein the polyvinyl formal has a degree of saponification of 95 to 100% and a degree of formalization of 30 to 90%.

5. An optical information recording medium as claimed in claim 1, wherein the polyvinyl formal has a molecular weight from 10,000 to 300,000.

6. An optical information recording medium as claimed in claim 1, wherein the thickness of the undercoating is 100 Å to 30 μm.

7. An optical information recording medium as claimed in claim 1, wherein the heat mode recording layer contains at least one metal selected from the group consisting of Mg, Sc, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Sn, As, Sb, Bi, Se, and Te.

8. An optical information recording medium as claimed in claim 1, wherein the thickness of the heat mode recording layer is 50 to 2,000 Å.

9. An optical information recording medium as claimed in claim 1, wherein the heat mode recording layer contains metals and a substance that improves sensitivity, said substance being selected from the group consisting of PbO, WO$_3$, TiO$_2$, SiO, SiO$_2$, ZrO$_2$, MoO, InO, InO$_2$, GeO, chalcogenide substances selected from the group consisting of Ge, In, Sn, Cu, Ag, Fe, Bi, Al, Si, Zn and V; a halide selected from the group consisting of PbX$_2$, AgX, SnX$_2$, SbX$_5$, and SbX$_3$ (where X is F, Cl, Br, or I); a sulfide selected from the group consisting of Cr$_2$S, MoS$_2$, CoS, NiS, and PdS; and a fluoride selected from the group consisting of MgF$_2$, CaF$_2$, and RhF$_3$.

10. An optical information recording medium as claimed in claim 9, wherein the substance that increases the sensitivity accounts for 10 to 70 vol% in the heat mode recording layer.

11. An optical information recording medium as claimed in claim 9, wherein the heat mode recording layer is composed of a metal and a substance that increases the sensitivity.

12. An optical information recording medium as claimed in claim 9, wherein the heat mode recording layer is comprised of a layer of a metal and a layer of a substance that increases the sensitivity.

13. An optical information recording medium as claimed in claim 12, wherein the thickness of the layer that increases the sensitivity is 10 to 1,500 Å.

14. An optical information recording medium as claimed in claim 1, wherein the heat mode recording layer is covered with a protective layer.

15. An optical information recording medium as claimed in claim 1, wherein the substrate contains a plasticizer.

16. An optical information recording medium as claimed in claim 15, wherein the substrate contains a plasticizer in an amount of 0.005 to 5 wt% based on the weight of the resin.

17. An optical information recording medium as claimed in claim 1, wherein the substrate contains a pigment.

18. An optical information recording medium as claimed in claim 1, wherein the substrate contains a pigment in an amount of 0.1 to 30 wt% based on the weight of the resin.

19. An optical information recording medium as claimed in claim 1, wherein the substrate contains an ultraviolet absorber.

* * * * *